(12) United States Patent
Ackermann et al.

(10) Patent No.: US 9,279,164 B2
(45) Date of Patent: Mar. 8, 2016

(54) METHOD FOR PRODUCING LEATHER FOR COVERING AIRCRAFT SEATS WITH LEATHER

(75) Inventors: Gregor Ackermann, Parschlug (AT); Manuel Zottler, Pasail (AT)

(73) Assignee: Wollsdorf Leder Schmidt & Co. Ges.M.B.H., Wollsdorf (AT)

( * ) Notice: Subject to any disclaimer, the term of this patent is extended or adjusted under 35 U.S.C. 154(b) by 0 days.

(21) Appl. No.: 14/005,212

(22) PCT Filed: Jan. 26, 2012

(86) PCT No.: PCT/EP2012/051219
§ 371 (c)(1),
(2), (4) Date: Sep. 13, 2013

(87) PCT Pub. No.: WO2012/123154
PCT Pub. Date: Sep. 20, 2012

(65) Prior Publication Data
US 2014/0000088 A1    Jan. 2, 2014

(30) Foreign Application Priority Data

Mar. 17, 2011 (AT) .................. 156/2011

(51) Int. Cl.
*C14C 13/00* (2006.01)
*C14B 1/02* (2006.01)
(Continued)

(52) U.S. Cl.
CPC ............... *C14C 9/00* (2013.01); *B60N 2/5891* (2013.01); *B64D 11/0647* (2014.12); *C14C 3/08* (2013.01); *C14C 3/28* (2013.01); *C14C 11/006* (2013.01); *Y02T 50/46* (2013.01); *Y10T 29/49826* (2015.01)

(58) Field of Classification Search
CPC ............ D04B 21/14; C14C 9/00; C14C 3/08; C14C 3/28; C14C 11/006; B60N 2/5891; B64D 11/0647; Y02T 50/46
USPC .......... 8/94.18, 94.21, 94.22, 94.33; 252/8.57
See application file for complete search history.

(56) References Cited

U.S. PATENT DOCUMENTS

| | | |
|---|---|---|
| 2008/0104766 A1 | 5/2008 | Hansel et al. |
| 2008/0299406 A1 | 12/2008 | Lee |
| 2010/0075559 A1* | 3/2010 | Hatori et al. ............... 442/308 |

FOREIGN PATENT DOCUMENTS

| | | |
|---|---|---|
| GB | 2 084 622 A | 4/1982 |
| JP | 2011-16931 A | 1/2011 |
| WO | WO 2008/037945 A1 | 4/2008 |

*Primary Examiner* — Gregory R Delcotto
*Assistant Examiner* — Preeti Kumar
(74) *Attorney, Agent, or Firm* — Dickstein Shapiro LLP

(57) ABSTRACT

In a manufacturing method (HV) for producing finished leather (FL) for covering components with leather, wherein the following process steps for treating a leather hide (LH) are performed on a raw hide (RH) as an initial product for producing the finished leather (FL) as an end product of the method:

mechanical process steps in which the leather hide (LH) is treated using mechanical tools, and chemical process steps in which the leather hide is treated with chemicals, wherein both mechanical and chemical modes of action are combined in individual process steps, it is envisaged that, in a process step of retanning, synthetic and/or vegetable tanning materials, fattening agents, microencapsulated auxiliary agents based on ammonium, phosphate, phosphorus and the ester compounds thereof and natural additives based on rubber and milk products are used, and in a process step of reducing the thickness of the leather hide, the leather thickness of the leather hide (LH) is reduced by splitting and/or scraping without reducing the physical authenticity, and in a process step of flame retardant application, an application material (AM) consisting of acrylic, polyurethane, vinyl acetate dispersions and having a flame retardant based on cyclic di- and triphosphates and organic ammonium with sulphur and phosphorus compounds is applied on the flesh side (FS) of the leather hide (LH).

6 Claims, 6 Drawing Sheets

(51) Int. Cl.
*A47C 9/00* (2006.01)
*C14C 9/00* (2006.01)
*B60N 2/58* (2006.01)
*C14C 3/08* (2006.01)
*C14C 3/28* (2006.01)
*C14C 11/00* (2006.01)
*B64D 11/06* (2006.01)

METHOD FOR PRODUCING LEATHER FOR COVERING AIRCRAFT SEATS WITH LEATHER

The invention relates to a manufacturing method for producing finished leather for covering components with leather, wherein the following process steps for treating a leather hide are performed on a raw hide as an initial product for producing the finished leather as an end product of the method:
  mechanical process steps in which the leather hide is treated using mechanical tools, and
  chemical process steps in which the leather hide is treated with chemicals, wherein both mechanical and chemical modes of action are combined in individual process steps.

Document DD 133969 A1 discloses a method for producing finished leather, with specific process steps with regard to chrome tanning being disclosed in said document.

In FIG. 1 of the enclosed figures, the individual process steps of a manufacturing method for producing leather are illustrated symbolically, as it is carried out according to the prior art. Animal hides, such as neat's hides, in the form of a raw hide RH serve as the initial product of the manufacturing method. In this specification, the intermediate produced in the various process steps of the manufacturing method is referred to as the leather hide LH and the final product of the manufacturing method is referred to as the finished leather FL.

As a first process step of soaking, which combines both mechanical and chemical modes of action, the leather hide LH is placed in a chemical C containing surfactants and enzymes in order to remove salt and dirt. The desired cleaning effect is achieved through rotation in the chemical C. Soaking is followed by a process step of liming and, subsequently, by the further process steps depicted in FIG. 1 until the finished leather FL is obtained as the final product of the manufacturing method according to the prior art.

It has turned out to be a disadvantage of the known method for producing finished leather that the finished leather which is produced does not meet the specific demands made on finished leather which is to be used, for example, for covering interior parts of vehicle spaces with leather and, in this connection, particularly for covering aircraft seats with leather. For this purpose, the finished leather has to be both mechanically tear-resistant and hard-wearing as well as particularly lightweight in order to keep the aircraft's total weight as low as possible. As a further requirement, a high flame retardance is required so that, upon the effect of high temperatures, seats located in the aircraft will not start to burn or at least not for as long as possible.

Thus, the invention is based on the problem of providing a method for producing leather wherein the previously mentioned disadvantages are avoided. The invention solves the problem in that, in a process step of retanning, synthetic and/or vegetable tanning materials, fattening agents, microencapsulated auxiliary agents based on ammonium, phosphate, phosphorus and the ester compounds thereof and natural additives based on rubber and milk products are used, and in a process step of reducing the thickness of the leather hide, the leather thickness of the leather hide is reduced by splitting and/or scraping without reducing the physical authenticity, and in a process step of flame retardant application, an application material consisting of acrylic, polyurethane, vinyl acetate dispersions and having a flame retardant based on cyclic di- and triphosphates and organic ammonium with sulphur and phosphorus compounds is applied on the flesh side of the leather hide.

As a result of the measures according to the invention, the advantage is achieved that the thickness of the leather hide is reduced by mechanical splitting and scraping, respectively, to a size with which it is only just ensured that the physical authenticity of the leather hide will be maintained. A person skilled in the art will understand "the physical authenticity of the leather hide" as strengths such as the tensile strength, the stitch tear strength, the tear-growth resistance of the leather hide, which is examined according to known DIN standards for leather.

By retanning with synthetic and/or vegetable tanning materials, specific fattening agents, rubber and microencapsulated additives and auxiliary agents, the softness, the flame protection and the emission values of the leather hide are improved.

Practical tests have shown that the flame retardant application of the application material claimed in the claim and of the laminating material claimed in the claim ensures a very good flame protection, as a result of which the finished leather advantageously is virtually non-inflammable even at very high temperatures.

By combining all those features in a manufacturing method for producing finished leather, a very lightweight, hard-wearing and flame-resistant finished leather is produced which is excellently usable particularly for covering vehicle seats such as, e.g., aircraft seats with leather.

Further advantages are addressed in further detail on the basis of the exemplary embodiment illustrated in the figures.

FIG. 1 symbolically shows the individual process steps during the production of finished leather according to the prior art.

In FIGS. 2 to 5, the individual process steps of a manufacturing method HV for the production of finished leather FL are illustrated in detail, with the mechanical and chemical process steps and the chemicals used therein being described in greater detail. Neat's hides from cows or bulls are used as the raw hide RH. A person skilled in the art of leather production is familiar with the individual process steps according to the prior art, for which reason this specification deals especially with the process steps according to the invention.

Figure 1:
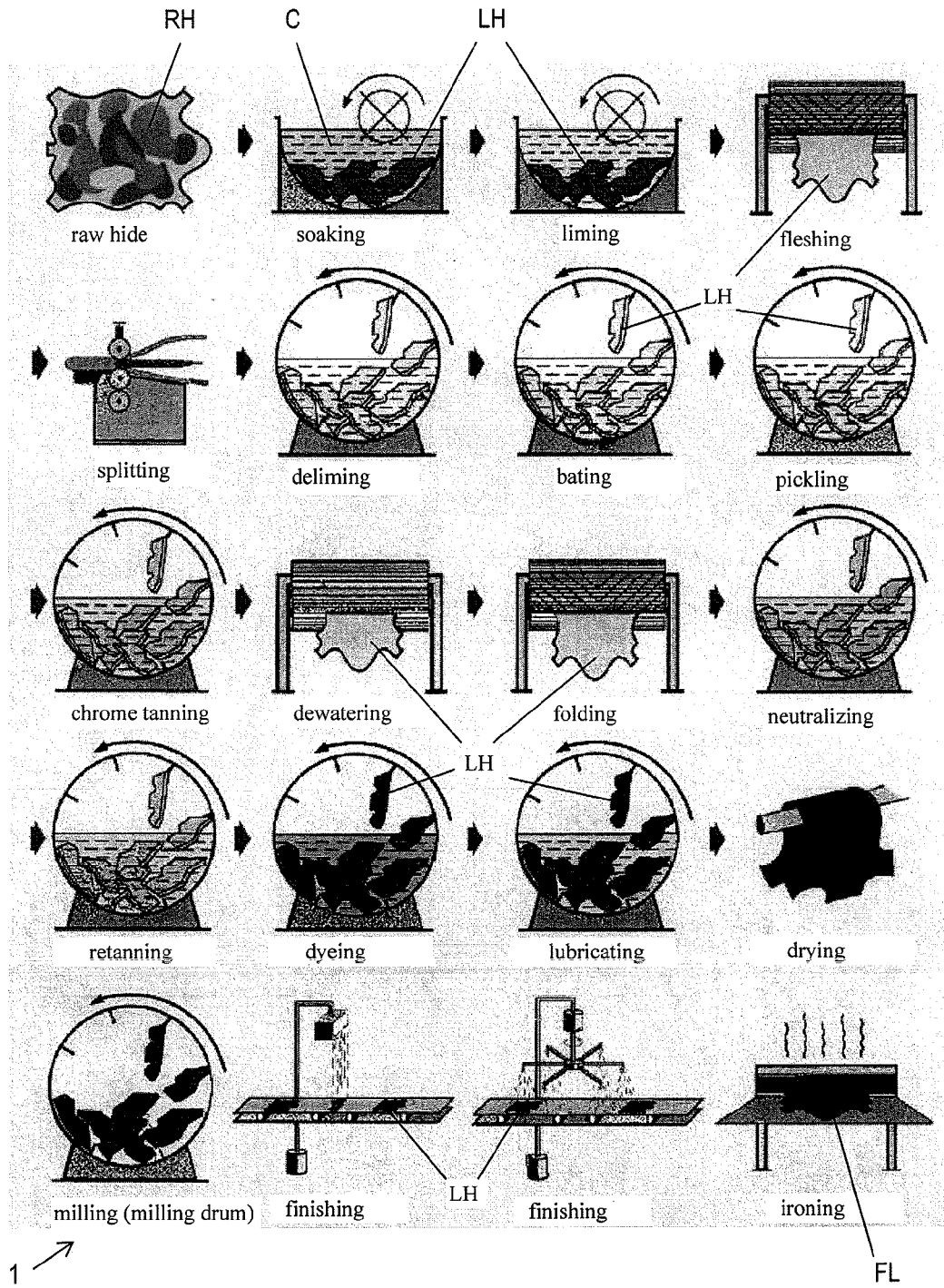
Figure 2:
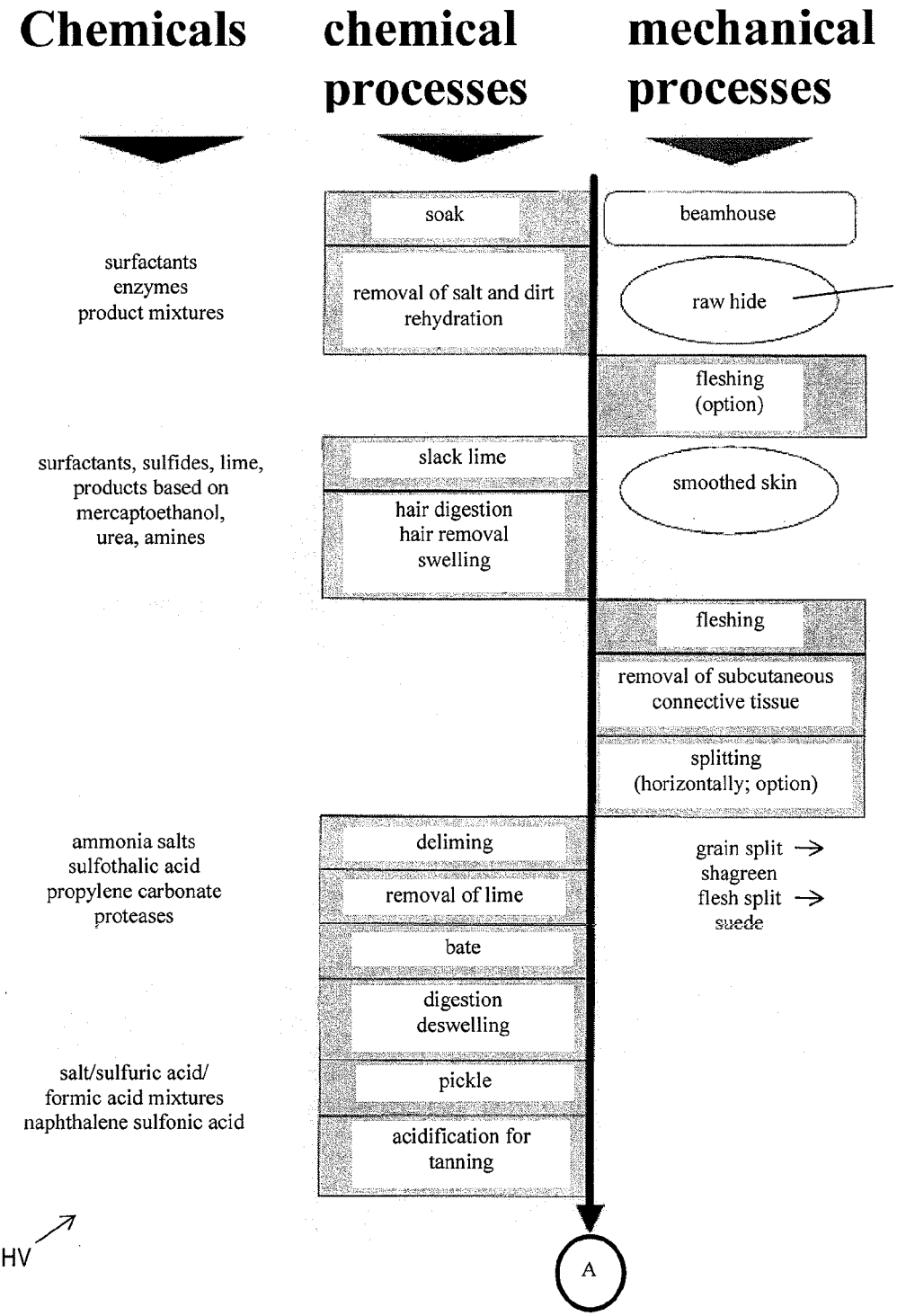
FIGS. 2 to 5 illustrate in detail the individual process steps of the manufacturing method according to the invention for the production of finished leather.
Figure 3:
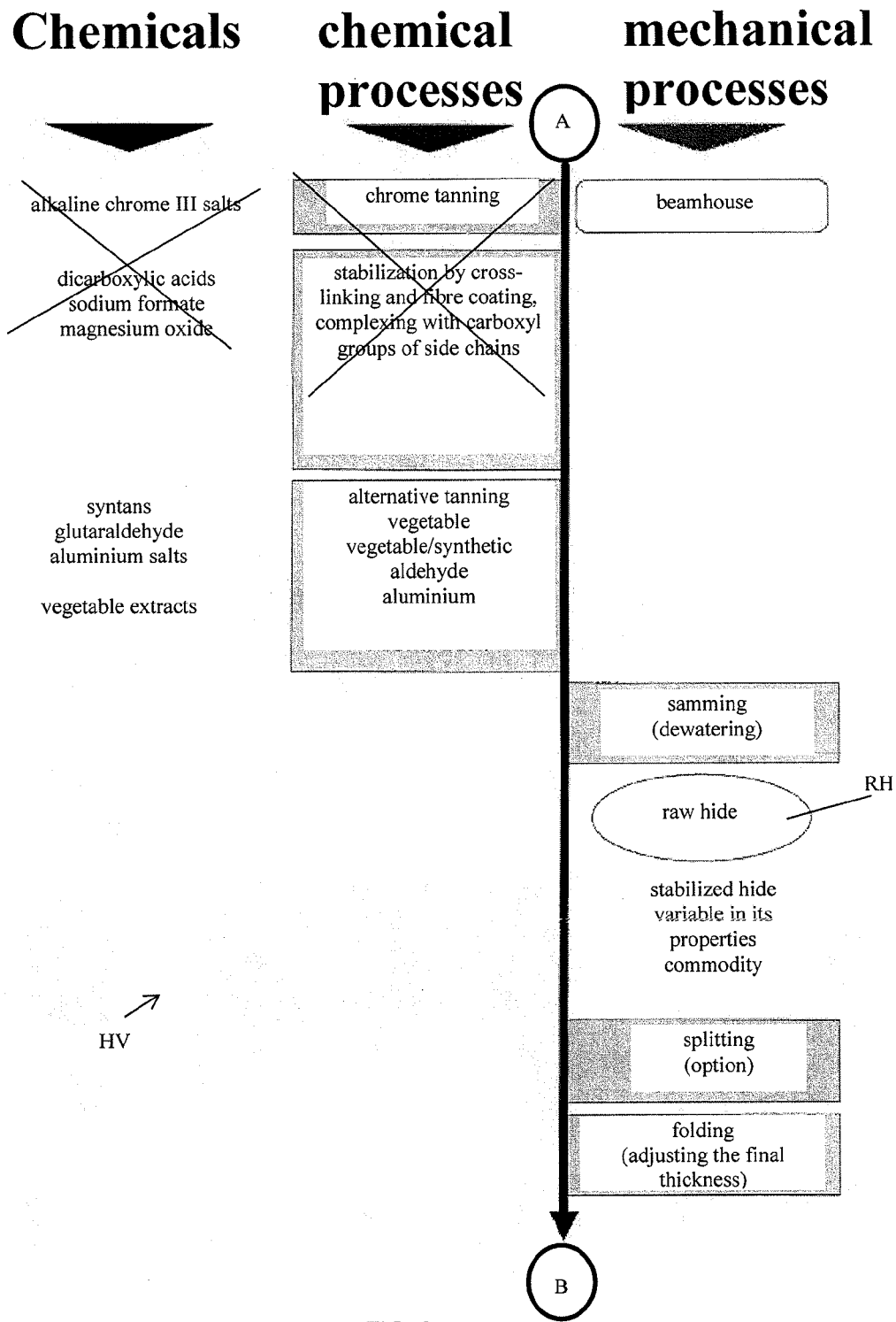

In FIG. 3, the process step of chrome tanning is indicated, as it is employed in manufacturing methods according to the prior art (see, for example, DD 133969 A1). Chrome pollutes both the environment and the finished leather FL, and for this reason the process step of chrome tanning can advantageously be omitted entirely due to the process step of retanning according to the invention.

Figure 4:
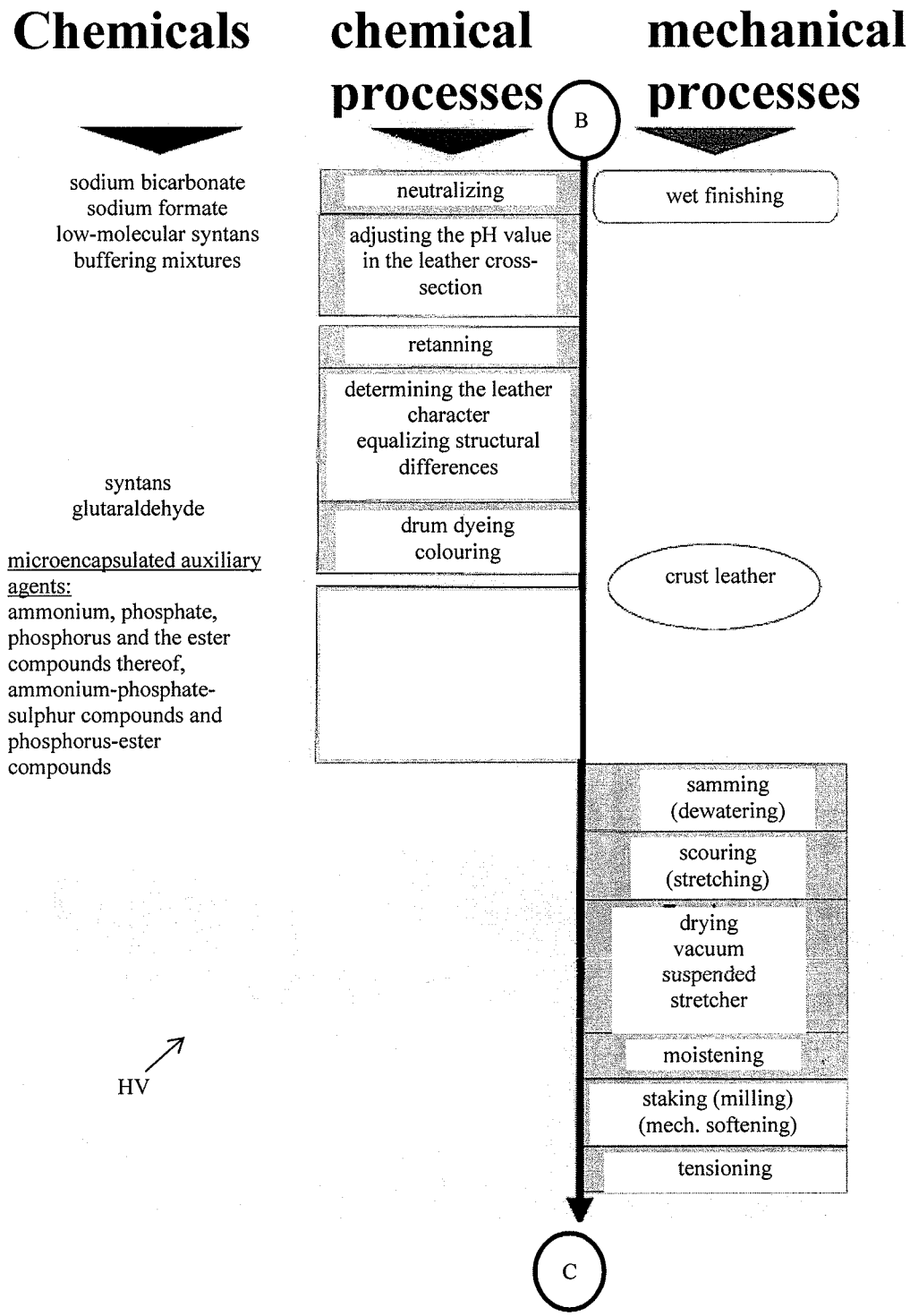

In FIG. 4, the process step of retanning is illustrated, wherein synthetic and/or vegetable tanning materials, fattening agents, microencapsulated auxiliary agents based on ammonium, phosphate, phosphorus and the ester compounds thereof and natural additives based on rubber and milk products are used for retanning. "Microencapsulated auxiliary agents" are thereby understood to be minimal amounts of the previously mentioned auxiliary agents which have been covered with a coating. The tanning agents used furthermore contain fattening agents based on synthetic and natural raw materials. Rubber and milk products, namely casein or milk powder, are thereby used as natural additives. In the process step of retanning, it is particularly advantageous to additionally use microencapsulated auxiliary agents based on ammonium-phosphate-sulphur compounds and phosphorus-ester compounds, which are encapsulated with casein or melamine.

Figure 5:
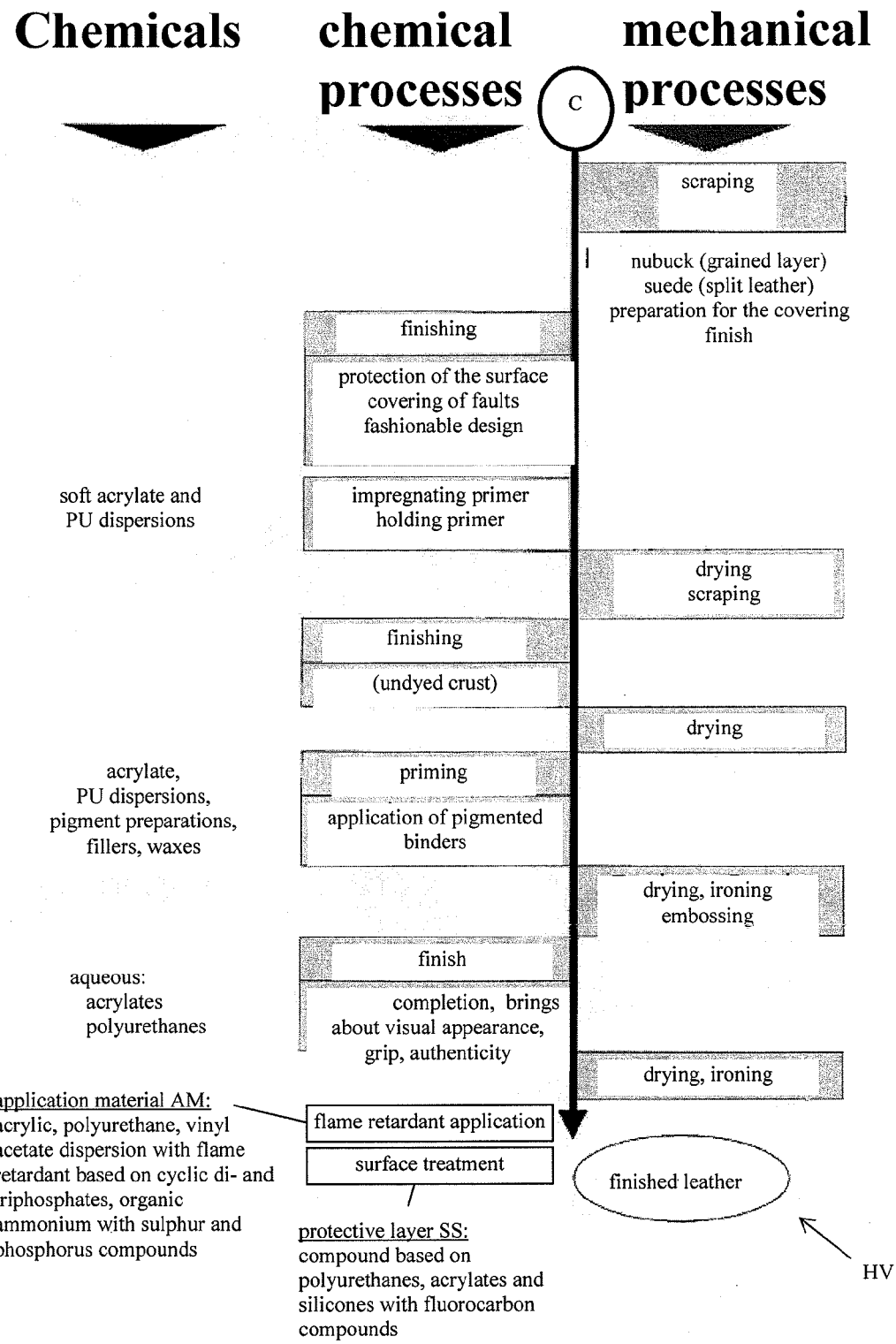
Figure 6:
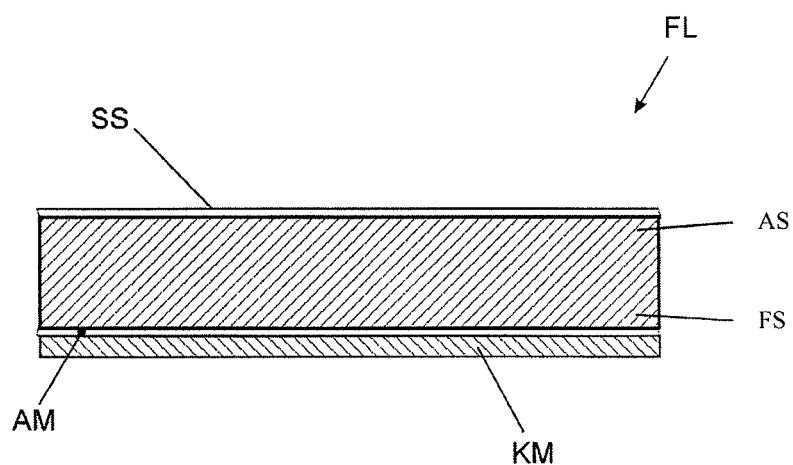
FIG. 6 shows in a sectional view the finished leather produced by the manufacturing method according to FIGS. 2 to 5.

In FIG. 5, the process step of scraping is indicated, wherein the size or thickness, respectively, of the leather hide LH is reduced by mechanical scraping on the flesh side FS. In doing so, just enough is scraped off so that the physical authenticity of the leather hide LH is maintained and not reduced, respectively.

In FIG. 5, the process step of flame retardant application is furthermore indicated, wherein an application material AM consisting of acrylic, polyurethane, vinyl acetate dispersions and having a flame retardant based on cyclic di- and triphosphates and organic ammonium with sulphur and phosphorus compounds is applied on the flesh side FS of the leather hide LH. A person skilled in the art is familiar with the individual components, a combination of which is used as an application material AM on a leather hide LH, but is new and inventive and has the substantial advantages of a particularly low flammability. It is particularly advantageous to apply the application material AM on the flesh side FS as a foam, since, in this way, it can be applied particularly evenly and penetrates well into the flesh side FS of the leather hide LH.

After the foaming of the application material, a flame-retardant laminating material KM is applied with rolls on the flesh side FS of the leather hide LH using a roll laminating equipment, with the laminating material KM consisting of felts of renewable natural fibres and/or a synthetic fibre material and/or a carbon fibre material, which are connected by PU thermobonding. In doing so, PU thermobonding forms an adhesive web. As a result, a laminating material KM is obtained which increases the mechanical strength of the finished leather FL as well as the resistance against inflammation of the finished leather FL.

In a process step of treating the surface of the finished leather FL, which concludes the manufacturing method HV of the finished leather FL, a protective layer SS containing a compound based on polyurethanes, acrylates and silicones with fluorocarbon compounds is applied on the outside AS of the finished leather FL. This surface treatment improves the soiling behaviour and the cleaning properties of the finished leather FL.

The use of the finished leather FL produced according to the manufacturing method HV for covering vehicle seats and in particular aircraft seats with leather has proved to be advantageous. In this way, it is possible to produce seats covered with leather which are very lightweight, but flame-resistant and dirt-repellent. This, on the one hand, reduces the fuel costs of the aircraft due to a lower total weight and, on the other hand, prolongs the period of use of the hard-wearing and dirt-resistant aircraft seats.

It may be mentioned that lamination may be performed with a light metal fabric (aluminium etc.). Furthermore, microencapsulation may be performed with helium or incombustible gases.

The invention claimed is:

1. A manufacturing method for producing finished leather for covering components with leather, wherein the following process steps for treating a leather hide are performed on a raw hide as an initial product for producing the finished leather as an end product of the method:

mechanical process steps in which the leather hide is treated using mechanical tools, and chemical process steps in which the leather hide is treated with chemicals, wherein both mechanical and chemical modes of action are combined in individual process steps, wherein the chemical process steps include a step of retanning using synthetic and/or vegetable tanning materials and fattening agents and microencapsulated auxiliary agents and natural additives, wherein the microencapsulated auxiliary agents comprise ammonium, phosphate, phosphorus and ester compounds thereof, and wherein the natural additives comprise rubber and milk products; and, wherein the mechanical process steps include a step of reducing the thickness of the leather hide, the leather thickness of the leather hide being reduced by splitting and/or scraping without reducing the physical authenticity, and wherein the chemical process steps include a step of applying a flame retardant using an application material and a flame retardant, wherein the application material comprises acrylic, polyurethane, and vinyl acetate dispersions, and wherein the flame retardant comprises cyclic diphosphates, triphosphates, organic ammonium, sulphur compounds, and phosphorus compounds, wherein the flame retardant is applied on the flesh side of the leather hide; and wherein, in the step of retanning, the microencapsulated auxiliary agents are encapsulated with casein or melamine.

2. A manufacturing method according to claim 1, wherein, in the process step of flame retardant application, the application material is sprayed on as a foam and, subsequently, a flame-retardant laminating material is applied with rolls on the flesh side of the leather hide, with the laminating material comprising felts of renewable natural fibres or a synthetic fibre material or a carbon fibre material, which are connected by contact or thermobonding.

3. A manufacturing method according to claim 1, wherein, in a process step of treating the surface of the finished leather, a protective layer comprising polyurethanes, acrylates and silicones with fluorocarbon compounds is applied on the outside of the finished leather.

4. A finished leather for covering components with leather produced by the manufacturing method according to claim 1, wherein the finished leather has a weight of less than 600 grams per square meter.

5. A finished leather according to claim 4, wherein the finished leather is used for covering the interior fittings of vehicles and/or ships and/or aircrafts with leather and in particular for covering aircraft seats with leather.

6. The manufacturing method according to claim 1, wherein the method is performed without using chrome as a tanning agent.

* * * * *